Oct. 11, 1927.

O. W. BALDWIN 1,644,811

COMBINATION SALT AND PEPPER SHAKER

Filed April 25, 1927

INVENTOR
O. W. Baldwin,
BY
ATTORNEY.

Patented Oct. 11, 1927.

1,644,811

UNITED STATES PATENT OFFICE.

OLIVER W. BALDWIN, OF GARY, INDIANA.

COMBINATION SALT AND PEPPER SHAKER.

Application filed April 25, 1927. Serial No. 186,286.

This invention relates to improvements in combination salt and pepper shakers, such as set forth and described in my United States Letters Patents, Numbers 1,581,666 and 1,581,667, granted April 20, 1926, respectively, and the objects of the improvements are, generally, to increase the efficiency and usefulness of such articles and to cheapen the manufacture thereof by simplifying the construction and operation.

Figure 1:
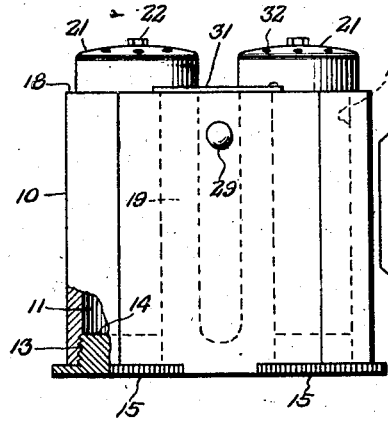
Figure 2:
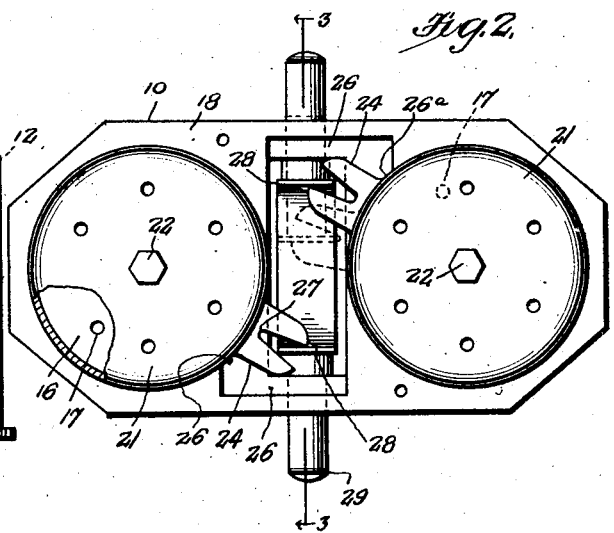
Figure 3:
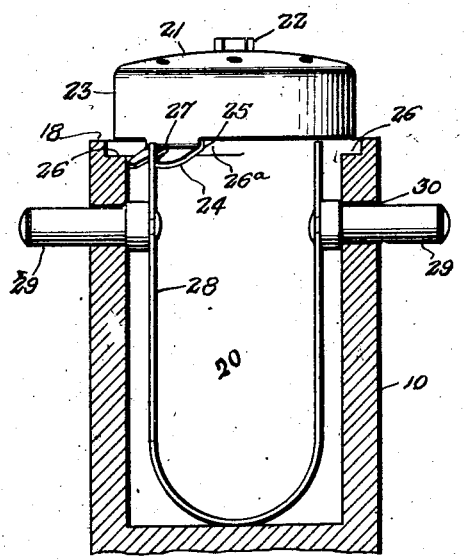
Figure 4:
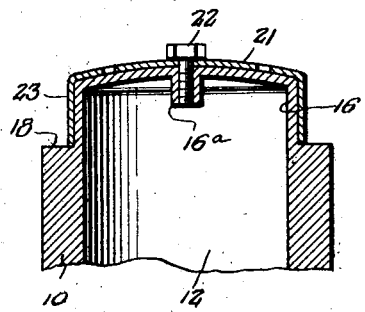
Figure 5:
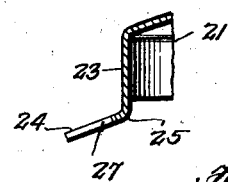

With the above and other objects in view, the invention consists in the novel arrangement, construction, and combination of parts hereinafter more fully described and explained, and illustrated in the accompanying drawing, wherein:

Figure 1 is a side view, on a reduced scale, of a salt and pepper shaker constructed in accordance with the invention, Figure 2, a top plan view of the proposed article, with a part removed to disclose the operating means, Figure 3, sectional view on line 3—3 of Figure 2, Figure 4, a fragmentary sectional view of the upper portion of one of the condiment compartments, illustrating the perforated top and closure therefor, and Figure 5, a fragmentary sectional view of one of the rotary closures, illustrating the inclination of the closure-operating finger.

Describing the invention in detail, 10 designates the body or casing of the article which is preferably rectangular in cross section and of any desired material. It is so formed as to present a pair of spaced parallel condiment-holding compartments 11 and 12, of circular cross section, extending longitudinally of the casing from top to bottom thereof with their respective lower ends opening outwardly of the bottom of the casing and internally threaded at 13 to receive the correspondingly threaded closures or stoppers 14, which have enlarged knurled heads 15 to facilitate screwing them in place. The bottom face of the casing is suitably cut away around the openings of the compartments to accommodate the enlarged heads of the stoppers and these heads jointly provide a flat base on which the article is conveniently supported when not in use. The upper face of the casing is formed with a pair of dome-shaped members 16 of the same material as the casing and being an integral part thereof; the top wall of the respective members being pierced with a circular series of openings 17 through which the contents of the compartments are dispensed and having a centrally depending lug or boss internally threaded to provide a screw-socket 16$^a$. These members 16 are each aligned with one of the compartments 11 or 12 to form perforated tops or outlets for the same, and are spaced inwardly from the sides and ends of the casing to leave a flat shoulder or ledge 18.

Compartments 11 and 12 are separated by an intervening wall or partition 19 which is recessed inwardly from the top of the casing to provide a central compartment or pocket 20 extending crosswise of the casing for substantially the full width of the same. This compartment is adapted to house the operating means as hereinafter explained. Snugly engaged over each perforated top 16 of the respective compartments 11 and 12 is a flanged, perforated, cap 21 fastened to the top at its center by means of a pivot screw 22 threadedly engaged in the screw-socket 16$^a$, as shown in Figure 4; the depending flange 23 of the cap extending down upon or near the surface of the shoulder or ledge 18 of the casing and having an integrally formed finger 24 projecting downwardly and outwardly from the base of the flange as shown at 25. The perforated caps are adapted to be rotated by means of the fingers 24 and, hence, are so placed upon the respective tops 16 that the fingers are disposed adjacent the open end of the central compartment or pocket 20 for engagement with the operating member. Each finger is adapted to move in a guide groove or recess 26 provided in the upper face of the casing at diagonally opposite corners of the open end of the compartment 20. These guide grooves are respectively formed with a short arcuate guiding surface 26$^a$ against which the butt ends 25 of the fingers 24 are adapted to bear and across which the said ends are constrained to move during the turning movement of the rotary caps 21. The fingers have their lower ends notched to provide V-shaped slots or notches 27 adapted to receive therein the upper portions of the spring arms 28 of the operating member and the latter is preferably a U-shaped spring strip inserted in the central compartment 20 and presenting opposed parallel spring arms 28, arranged to move in a direction paralleling the inner opposing walls of the compartments 11 and 12. The arms 28 are flexed to normally rest against the end-walls of the central compartment and are movable towards each other for rotating the caps 21 to bring the perforations of the latter into registry with the perforations of the compartment tops 16; these perforations being offset in the normal position of the spring arms. The rotary caps are rotated, either singly or jointly, by pressing upon operating buttons 29 attached to the spring arms near their upper ends and projecting outwardly on opposite sides of the casing through suitable openings 30 in the end-walls of the spring compartment 20. The words "Salt" and "Pepper", or other suitable indicia, may be provided on the sides of the casing somewhere near the respective buttons to designate the contents dispensed by the operation of the individual button.

A cover plate 31, having concaved side portions designed to fit between the perforated tops of the condiment compartments, is attached to the upper face of the casing by screws 32 and completely covers the open end of the spring compartment 20 as well as the guide grooves 26. This cover-plate is readily removable for replacing the spring or removing the perforated caps after the pivot screw is withdrawn and when in place serves to cover and protect the parts. The V-shaped slots of the cap-fingers permit the spring arms to shift easily back and forth within the slot as the finger moves in the arc of a circle and there is no danger of the spring and finger becoming disengaged.

From the foregoing, it will be apparent that but a minimum number of parts are required in the construction of the article and that there are, therefore, less pieces to get out of order. The assembly is such that the parts are operatively associated in a compact and practical manner insuring the maximum space for the condiment contents and the free unobstructed discharge thereof through the dispensing caps.

Having thus described the invention, what I claim as new is:

1. A condiment holder comprising a casing having condiment-holding compartments, perforated dome-shaped members integral with the upper face of the casing and respectively aligned with the said compartments to form perforated tops for the latter, said casing being recessed to provide a short arcuate guiding surface at the base of each dome-shaped top, a perforated cap rotatably carried by each perforated top and having a downwardly and outwardly projecting finger adapted for movement over the guiding surface at the base of the said top, and an operating connection between the said fingers of the respective caps for imparting movement thereto.

2. A condiment holder comprising a casing having compartments separated by a partition recessed to provide a pocket, perforated dome-shaped members integral with the casing and aligned with said compartments to provide perforated tops for the latter, an arcuate guide at the base of each dome-shaped member, a perforated rotatable cap covering each dome-shaped member and having an operating finger engaged with an arcuate guide, a U-shaped resilient member within said pocket and having parallel arms arranged to move in a direction paralleling the inner opposing walls of the said compartments, said arms being operatively connected with the said fingers, and push buttons carried by said arms.

3. A condiment holder comprising a casing having condiment-holding compartments separated by an intervening partition recessed inwardly from the top of the casing to provide a central pocket extending crosswise of the casing for substantially the full extent of the latter, said casing having short arcuate grooves at diagonally opposite corners of the open end of the said pocket and being further provided on its upper surface with perforated dome-shaped extensions respectively aligned with the said compartments to provide perforated tops for the latter, a flanged perforated cap rotatably carried by each dome-shaped extension and having a finger projecting downwardly and outwardly from the base of the flange and adapted to move in the said arcuate grooves of the casing, a U-shaped spring within the said pocket presenting spring arms the under ends of which are received in V-shaped notches in said fingers, and operating buttons carried by said spring arms.

4. A condiment holder comprising a casing having compartments separated by a partition recessed to provide a pocket extending inwardly from the top of the casing and crosswise thereof for substantially the full width of the latter, the upper face of the casing being recessed at diagonally opposite corners of the open end of the pocket to provide short arcuate grooves and having dome-shaped integral extensions aligned with the compartments and perforated to form outlets therefor, a flanged perforated cap covering each extension and rotatably secured thereto, a finger projecting downwardly and outwardly from the base of the cap flange and having a V-shaped notch in its outer end, said finger being adapted to move in an arcuate groove, a U-shaped spring within said pocket having parallel spring arms received in the V-shaped notches of the fingers and arranged to move in a direction paralleling the inner opposed walls of the compartments, and push buttons carried by said arms and operable from the outside of the casing.

In testimony whereof I hereunto affix my signature.

OLIVER W. BALDWIN.